US012753903B2

(12) United States Patent
Ansems et al.

(10) Patent No.: US 12,753,903 B2
(45) Date of Patent: Oct. 6, 2026

(54) LIGHT DIFFUSER

(71) Applicant: SIGNIFY HOLDING B.V., Eindhoven (NL)

(72) Inventors: Johannes Petrus Maria Ansems, Hulsel (NL); Marcus Theodorus Maria Lambooij, Eindhoven (NL); Peter Johannes Martinus Bukkems, Deurne (NL); Derk Tiekink, Mierlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/144,689

(22) PCT Filed: Dec. 20, 2023

(86) PCT No.: PCT/EP2023/086913

§ 371 (c)(1),
(2) Date: Jun. 30, 2025

(87) PCT Pub. No.: WO2024/146804

PCT Pub. Date: Jul. 11, 2024

(65) Prior Publication Data

US 2026/0218877 A1 Jul. 30, 2026

(30) Foreign Application Priority Data

Jan. 2, 2023 (EP) .................................... 23150006

(51) Int. Cl.

| | |
|---|---|
| ***F21V 3/00*** | (2015.01) |
| ***F21V 3/02*** | (2006.01) |
| ***F21V 3/06*** | (2018.01) |
| ***F21V 17/10*** | (2006.01) |
| ***G02B 5/02*** | (2006.01) |
| *F21Y 115/10* | (2016.01) |

(52) U.S. Cl.

CPC .............. *F21V 3/0625* (2018.02); *F21V 3/02* (2013.01); *F21V 17/10* (2013.01); *G02B 5/021* (2013.01); *G02B 5/0278* (2013.01); *F21Y 2115/10* (2016.08)

(58) Field of Classification Search

CPC .......... F21V 3/0625; F21V 3/02; F21V 17/10; G02B 5/021; G02B 5/0278

See application file for complete search history.

(56) References Cited

U.S. PATENT DOCUMENTS

| | | | | |
|---|---|---|---|---|
| 5,372,756 | A | 12/1994 | Oyama | |
| 11,846,794 | B2 * | 12/2023 | Vasylyev | G02B 6/0028 |
| 2008/0094845 | A1 | 4/2008 | Kusano et al. | |
| 2008/0316770 | A1 | 12/2008 | Oku et al. | |
| 2010/0321923 | A1 | 12/2010 | Paek et al. | |

(Continued)

FOREIGN PATENT DOCUMENTS

| | | | |
|---|---|---|---|
| CN | 103941327 | A | 7/2014 |
| DE | 1835579 | U | 7/1961 |

(Continued)

*Primary Examiner* — Gerald J Sufleta, II

(57) ABSTRACT

A light diffuser formed of a corrugated light diffusive film. The corrugations allow the light diffusive film to bend or curve within a particular plane, allowing the light diffusive film to follow or track the shape of an elongate light exit window for a luminaire.

12 Claims, 5 Drawing Sheets

(56) References Cited

U.S. PATENT DOCUMENTS

| | | | | |
|---|---|---|---|---|
| 2013/0093980 | A1* | 4/2013 | Goto .................... | G02B 6/0068 362/613 |
| 2020/0064540 | A1* | 2/2020 | Nichol ................. | G02B 6/0018 |

FOREIGN PATENT DOCUMENTS

| | | | |
|---|---|---|---|
| DE | 202019107018 | U1 | 3/2021 |
| EP | 2484961 | A1 | 8/2012 |

* cited by examiner

LIGHT DIFFUSER

CROSS-REFERENCE TO PRIOR APPLICATIONS

This application is the U.S. National Phase application under 35 U.S.C. § 371 of International Application No. PCT/2023/086913, filed on Dec. 20, 2023, which claims the benefit of European Patent Application No. 23150006.7, filed on Jan. 2, 2023. These applications are hereby incorporated by reference herein.

FIELD OF THE INVENTION

The present invention relates to the field of lighting, and in particular to light diffusers.

BACKGROUND OF THE INVENTION

There is an ever increasing use of artificial lights in a number of environments, such as industrial, domestic, office and clinical environments. A recent trend is the integration of artificial lights into the internal design of such environments. In pursuit of this, there is a desire for the provision of artificial lights that emit light from an elongate and/or curved light output surface, such as an arced output surface.

A typical artificial light is formed as a luminaire. Luminaires typically comprise a light emitting arrangement, a housing and one or more light filters/diffusers. In conventional production techniques for such luminaires, each element is designed or produced specifically for that luminaire.

It would be advantageous if one or more parts/elements of the luminaire could be produced in a manner that allows use of such parts/elements in multiple different forms/structures of luminaire.

SUMMARY OF THE INVENTION

The invention is defined by the claims.

According to examples in accordance with an aspect of the invention, there is provided a deformable, flexible and/or resilient light diffuser comprising a film of light diffusive material.

The film is corrugated to form a series of alternating ridges and grooves along a first direction lying in a first plane, each ridge being located above the first plane and each groove being located below the first plane, such that application of a force to the film in a second direction causes the film to elastically or plastically curve or bend in the first plane. The second direction lies in the first plane and is perpendicular to the first direction.

The present disclosure proposes a corrugated film of light diffusive material. The corrugations facilitate curving of the film away from a line along which the corrugations lie. This means that the film of light diffusive material can be readily adapted for any shape and/or size of luminaire, in particular, to account for any sized curve of a light output window of the luminaire.

The proposed approach avoids the need for dedicated or luminaire-specific light diffusers to be produced. Rather, a same light diffuser structure can be produced and adapted to fit in any form of luminaire, particularly luminaires having elongate light exit windows which may be linear and/or curved.

In some examples, when no force is applied to the film in the second direction, the distance between each ridge and the first plane and the distance between each groove and the first plane is no less than 0.5 mm, e.g., no less than 1 mm, e.g., no less than 2 mm. The larger the distance between a ridge/groove and the first plane, the greater the curving or bending that the film is able to perform (i.e., the smaller the potential radius of curvature).

In some examples, when no force is applied to the film in the second direction, the distance between each ridge and the first plane and the distance between each groove and the first plane is no greater than 6 mm, e.g., no greater than 4 mm. Large values for the distance between a ridge/groove and the first plane will result in higher levels of visibility of the light diffuser and the resultant pattern in diffused light to an individual.

A good compromise for the distance between each ridge/groove and the first plane to balance these two requirements is between 0.5 mm and 6 mm, e.g., between 2 mm and 4 mm.

The application of the force to the film in the second direction may cause a resultant center of curvature of the film to be defined; and the distance between each ridge/groove and the first plane to decrease less at a side of the film closer to the resultant center of curvature than at a side of the film further from the resultant center of curvature. This facilitates the curving of the film responsive to the force in the second direction.

Preferably, the maximum distance (i.e., the pitch) between any two neighboring ridges, or any two neighboring grooves, is no more than 1 cm/10 mm, and preferably no more than 6 mm. Large values for the pitch will result in higher levels of visibility of the light diffuser and the resultant pattern in diffused light to an individual. Large values for the pitch will also reduce the curving or bending that the film is able to perform.

In some examples, the maximum distance between any two neighboring ridges, or any two neighboring grooves, is no less than 0.5 mm, e.g., no less than 1 mm. Extremely small pitch values are difficult to manufacture, increasing manufacturing complexity and cost.

In preferred examples, the thickness of the film of light diffusive material is less than 2 mm, and even more preferably less than 0.5 mm. Large film thicknesses increase manufacturing costs and increase the amount of light undesirably absorbed by the light diffuser (i.e., reduce the transmissivity of the light diffuser). Larger material thickness also require deeper or larger ridges/grooves, with a larger distance between the ridges and grooves, making them more visible and less desirable. Moreover, a larger thickness will also require a larger bending force to bend the corrugated material, increasing a difficulty and danger of installation and/or manipulation.

The film may have a sinusoidal shape to define the series of alternating ridges and grooves. In other examples, the film has a sawtooth shape to define the series of alternating ridges and grooves. In yet other examples, the film has a square wave shape to define the series of alternating ridges and grooves. In yet other example, the film has a triangular or triangular wave shape.

A sinusoidal shape is particularly advantageous as such shapes are less visible to an individual and have a smoother transition within a pattern of light transmitted through the film.

In some examples, both the distance between each ridge and the first plane and the distance between each groove and the first plane decreases responsive to the film being stretched in the first direction.

The film is preferably produced using an extrusion and/or rolling process. This provides a reliable, fast and effective mechanism for manufacturing the light diffuser, which could be performed at an installation location for a luminaire. The material of the light diffuser, and optionally also of the housing, could be resilient, i.e. elastically deformable, or could be plastically deformable, i.e. capable of being deformable permanently in any direction without rupture.

There is also proposed a luminaire comprising: a light emitting arrangement configured to emit light; a housing, configured to house the light emitting element, and comprising a light exit window for permitting the exit of light emitted by the light emitting arrangement out of the housing; and any herein described light diffuser configured to cover the light exit window to diffuse light exiting through the light exit window.

The luminaire could have the feature that the housing has two opposing side walls, each side wall having a respective elongated slot in a respective inner wall and adjacent the light exit window for holding the light diffuser. The light diffuser thus accommodated and held in said slots counteracts undesired light leakage through openings between housing and the light diffuser due to the grooves and ridges in the light diffuser.

Preferably said elongated slot is v-shaped in cross-section to hold the light diffuser snugly both in unbend and in bended form. Especially, it is thus enabled that the thickened part of the light diffuser, formed upon bending of the light diffuser, shifts over a shift δ to the wider portion of the V-shaped slot while the thinned part of the light diffuser, formed upon bending of the light diffuser, shifts by (about) the same shift δ to the narrower portion of the V-shaped slot.

Preferably, the light exit window is curved and the light diffuser is configured to follow the curve of the light exit window. In particular, the light exit window may be formed as an elongate curve.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
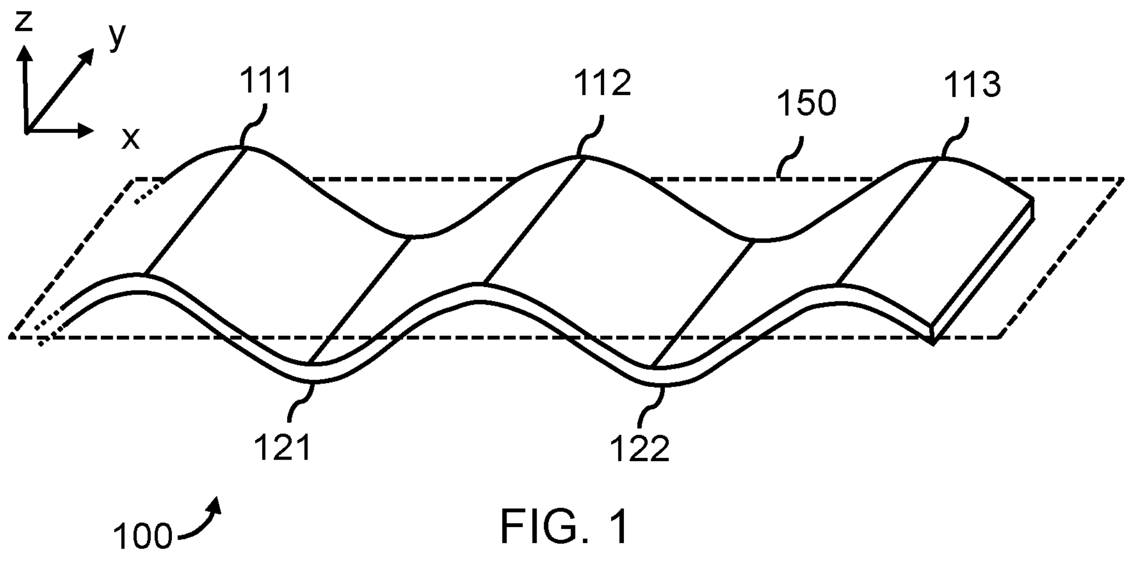
FIG. 1 illustrates a light diffuser according to a first embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a light diffuser formed of a corrugated light diffusive film. The corrugations allow the light diffusive film to bend or curve within a particular plane, allowing the light diffusive film to follow or track the shape of an elongate light exit window for a luminaire.

Embodiments are based on the realization that introducing corrugations into a light diffuser facilitates bending or curving of the light diffuser by exploiting the stretching of the light diffuser along the corrugations.

FIG. 1 illustrates a light diffuser 100 according to an embodiment.

The light diffuser 100 is formed of a corrugated film of light diffusive material. Thus, there is a film of light diffusive material that has been corrugated so as to form corrugations. Alternative names for light diffusive material include light dispersal materials, light scattering materials and so on.

Examples of light diffusive materials are well known in the art. A light diffusive material may comprise a material infused with diffusive or scattering particles to diffuse/scatter received light.

By way of example, the light diffusive material may comprise a polymer material doped with scattering particles. Suitable examples of polymer materials for use as the optical plate include transparent PP, PC, PS or PMMA. Suitable examples of scattering particles include nano Barium sulfate, Silicon dioxide, calcium carbonate, organic silicon, acrylic resin, silver particles and so on. The diameter of the scattering particles may be between 0.1 μm to 10 μm. The density of the scattering particles will be related to the type and size of the scattering particles selected.

Approaches for doping polymer materials with scattering particles will be apparent to the skilled person, and could include diffusion and/or implantation techniques. The term "doping" is here used to refer to the intentional introduction or provision of foreign particles (namely, scattering particles) into the polymer material to modify the properties (here, at least the transmittance and diffusion) of the polymer material. An alternative label to the term "doping" is blending.

The corrugated film forms or defines a series of alternating ridges 111, 112, 113 and grooves 121, 122 along a first direction x of the film. The first direction x lies within a first plane 150, which here is the x-y plane. Each ridge 111, 112, 113 is being located above the first plane 150 and each groove 121, 122 is located below the first plane 150.

An alternative label for a ridge is a peak. An alternative label for a groove is a trough or furrow. Collectively, ridges and grooves can be referred to as corrugations (in the corrugated film).

The configuration of the ridges 111, 112, 113 and grooves 121, 122 is such that application of a force to the film in a second direction y (also lying in the first plane 150) causes the film to curve or bend in the first plane. The second direction y is perpendicular to the first direction x. In this way, the film can be bent or curved within the first plane 150. This allows, for instance, the light diffuser to be manipulated to mirror or follow the shape of a light exit window of a luminaire.

The underlying concept is therefore the use of a corrugated diffuser film which makes it possible to bend the diffuser in a plane, namely the first plane 150.

The film can be corrugated by appropriately bending or folding the film to form the series of ridges and grooves. Making such corrugated films can easily be performed, for instance, as part of an extrusion and/or rolling process. This technique can, for instance, be used to produce the light diffuser illustrated in FIG. 1.

The film of the illustrated light diffuser 100 is formed to have a sinusoidal shape to define the series of alternating ridges and grooves. However, it will be appreciated that the film could be formed in other shapes, such as a triangular wave shape, a sawtooth shape or a square wave shape.

A sinusoidal shape is particularly advantageous as the corrugations (and the resultant pattern of light emitted through the light diffuser) have a reduced perceived visibility to an individual. In particular, a smooth sinusoidal shape is less visible to an individual than, for example, a sawtooth or squared shapes.

A sinusoidal or triangular shape are easier to manufacture than other forms of shapes.

The corrugations will result in the distance between each ridge and the first plane and the distance between each groove and the first plane decreasing responsive to the film being stretched in the first direction. Thus, the film may effectively concertina. It will be apparent that the first direction x, the second direction y and the third direction z define axes (which can similarly be labelled x, y and z). The orientation of these axes with respect to the light diffuser 100 have been indicated throughout the Figures where relevant.

Figure 2:
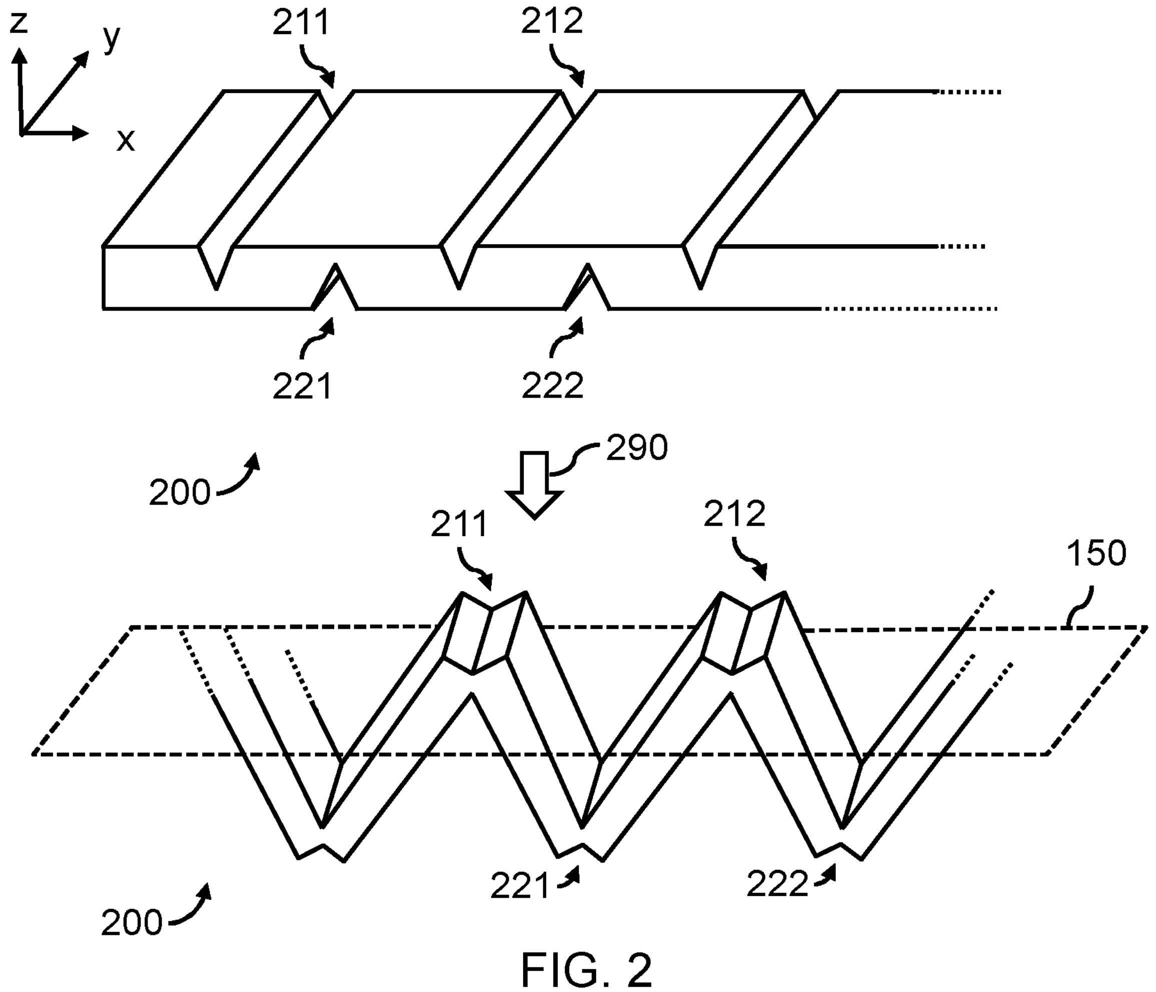
FIG. 2 illustrates a light diffuser according to a second embodiment.

FIG. 2 illustrates another light diffuser 200 according to an embodiment. The light diffuser is again formed of a corrugated film of light diffusive material. The corrugations in the film forms a series of alternating ridges and grooves along a first direction x of the film.

The light diffuser 200 differs from the previously described light diffuser 100 in that the corrugation of the film is achieved by cutting channels 211, 212, 221, 222 (that define bending locations or hinges) on alternating sides of the film along the first direction. Each channel thereby defining a hinge that can be used to corrugate the film (illustrated by a process 290), thereby creating respective ridges and grooves. Thus, each channel represents or defines the location of a ridge or groove.

In particular, a channel 211, 212 in an upper side defines a location of a ridge in the light diffuser 200 and a channel 221, 222 in a lower side defines a location of a groove in the light diffuser. If stretched in the x-axis, the light diffuser 200 would flatten or begin to flatten.

As before, when corrugated, each ridge is located above the first plane 150 and each groove is located below the first plane In the following description, the light diffuser 200 may be used in place of the indicated light diffuser 100 to much the same effect.

Figure 3:
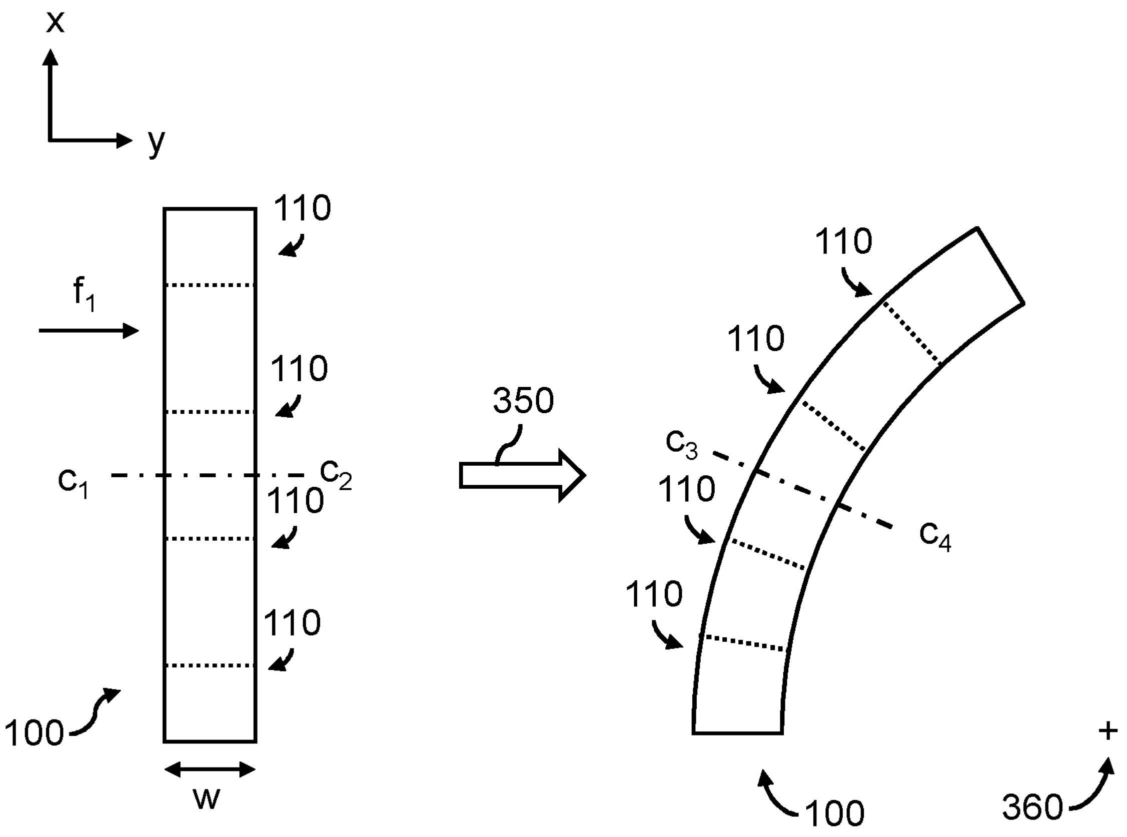
FIG. 3 illustrates the effect of applying a force to the light diffuser.
Figure 4:
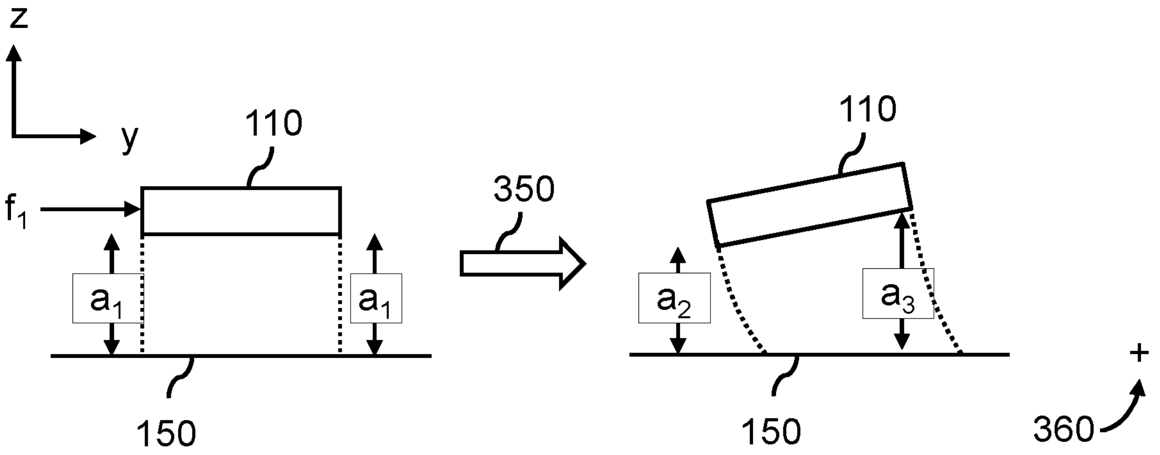
FIG. 4 also illustrates the effect of applying the force to the light diffuser.

FIGS. 3 and 4 illustrate how the corrugation is able to facilitate bending of the film when a force in the second direction y is applied. FIG. 3 provides a top-down view (i.e., a view of the x-y plane) of the light diffuser 100. FIG. 4 provides a cross-sectional view (i.e., a view of the y-z plane) of the light diffuser.

FIG. 3 illustrates how the application 350 of a force $f_1$ in the second direction to the light diffuser 350 causes the light diffuser to bend or curve within the first plane (x-y). In particular, the application of the force $f_1$ causes a resultant center of curvature 360 of the film to be defined. The center of curvature defines the center of a hypothetical circle around whose perimeter the bend/curved light diffuser 100 follows.

FIG. 3 also illustrates a plurality of ridges 110 found in the light diffuser. As illustrated in FIG. 3, upon application 350 of the force $f_1$, the ridges 110 and grooves (not illustrated) are aligned with a radial line of the hypothetical circle having a center at the resultant center of curvature 360.

FIG. 4 illustrates the effect of the bending of the film in the y-z plane.

A first part of FIG. 4 illustrates the position/orientation of a ridge 110 before the force $f_1$ is applied 350. This first part illustrates a cross-sectional view in the plane $c_1$-$c_2$ illustrated in FIG. 3.

A second part of FIG. 4 illustrates the position/orientation of a ridge 110 after the force $f_1$ is applied 350. This second part illustrates a cross-sectional view in the plane $c_3$-$c_4$ illustrated in FIG. 3.

Initially (before the force $f_1$ is applied 350), the distance $a_1$ between each ridge/groove 110 and the first plane is the same at both sides of film relative to the resultant center of curvature that will come about from applying the force $f_1$.

After the force $f_1$ has been applied 350, the distance between each ridge/groove and the first plane decreases less at a side of the film closer to the resultant center of curvature 360 than at a side of the film further from the resultant center of curvature. Thus, the inner amplitude $a_3$ (being a distance between the ridge/groove at a side closest to the center of curvature 360) is greater than an outer amplitude $a_2$ (being a distance between the ridge/groove at a side furthest from the center of curvature 360).

Thus, the distance $a_2$ (between the ridge 110 and the first plane 150) at a side of the film further from the center of curvature is less than the distance $a_3$ between the same ridge 110 and the first plane at a side of the film closer to the center of curvature. The distance $a_2$ represents an outer amplitude or distance and the distance $a_3$ represents an inner amplitude or distance.

This effect comes about as a result of the curving of the film in the x-y plane. This is because the side further from the center of curvature 360 needs to travel a larger distance than the side closer to the center of curvature. This understanding of the increased distance is perhaps best illustrated by FIG. 3.

It is possible to determine the difference between the inner $a_2$ and outer $a_3$ amplitude, although the skilled person will appreciate that this depends upon the width w of the light diffuser 100 (i.e., a distance across the light diffuser in the y-direction) and the structure of the light diffuser (e.g., whether the corrugations form a sinusoidal shape or another form of shape).

Table 1 illustrates example differences in the outer $a_2$ and inner $a_3$ amplitudes for a corrugated film having a sinusoidal like structure with a curvature of 300 mm radius and a width w of 50 mm.

TABLE 1

| Inner Amplitude $a_3$ (mm) | Outer Amplitude $a_2$ (mm) | $a_2/a_3$ |
|---|---|---|
| 6 | 5.09 | 0.849 |
| 5 | 4.22 | 0.844 |
| 4 | 3.34 | 0.835 |
| 3 | 2.45 | 0.817 |
| 2 | 1.54 | 0.768 |
| 1 | 0.45 | 0.450 |

Table 1 helps illustrate how the greater the initial distance $a_1$, the larger the amount that the film can be curved. The value $a_2/a_3$ illustrates the amount of additional bending that can take place, such that a smaller value indicates a smaller amount of additional bending or curving.

FIG. 3 also illustrates a width w of the film of diffusive material. The width w of the film is a distance across the film (before the force $f_1$ is applied 350) in the second direction y.

Figure 5:
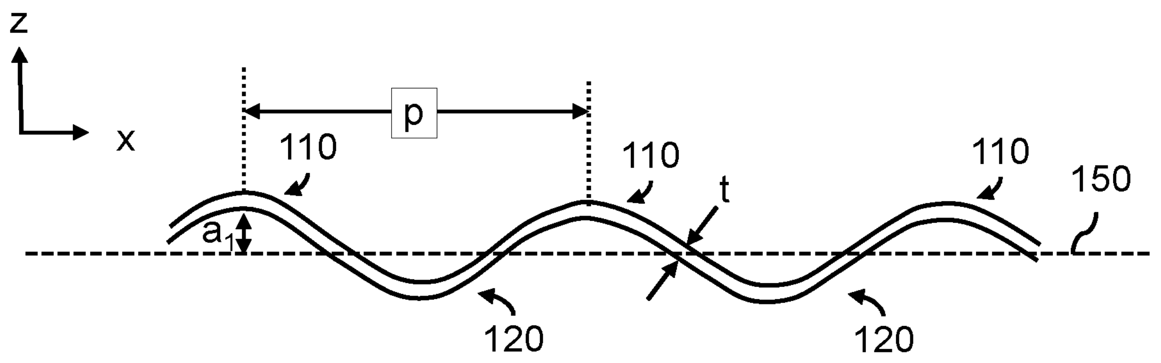
FIG. 5 provides a side view of the light diffuser according to the first embodiment.

FIG. 5 provides a side or profile view of the light diffuser 100. This is useful for understanding various dimensions of the light diffuser 100. The skilled person would be readily capable of transferring the teaching of the following description to other embodiments of the light diffuser (e.g., that illustrated in FIG. 2).

It is possible to define a distance $a_1$ (when no force is applied to the film in a second direction) between each ridge 110 and the first plane 150, as well as the distance between each groove 120 and the first plane 150.

Preferably, the distance $a_1$ is no less than 1 mm, e.g., no less than 2 mm. The greater the distance $a_1$, the greater the curvature that the film is able to perform in the first plane and therefore the greater the adaptability of the light diffuser to different forms of luminaire or lighting systems.

However, increased values for the distance $a_1$ also result in increased visibility of the corrugations and the resultant pattern of light emitted through the light diffuser. Thus, in preferred examples, the distance $a_1$ is no greater than 10 mm, e.g., no greater than 6 mm, e.g., no greater than 4 mm.

The value of the distance $a_1$ is preferably in the range $a_1 \geq A_1$; $a_1 \leq A_2$ and/or $A_1 \leq a_1 \leq A_2$. Example values for $A_1$ include: 1 mm or 2 mm. Example values for $A_2$ include: 10 mm, 6 mm or 4 mm. Other suitable values will be apparent to the skilled person.

It is also possible to define the maximum distance p between any two neighboring ridges or any two neighboring grooves. Two ridges/grooves neighbor one another when they are one of the two closest to one another amongst any of the ridges/grooves. Naturally, all ridges/grooves that are not located at an end of the light diffuser will have two neighboring ridges/grooves, with those located at the end of the light diffuser having a single neighboring ridge/groove.

An alternative label for the maximum distance p is a pitch.

Preferably, the maximum distance/pitch p is no more than 10 mm, e.g., no more than 6 mm, e.g., no more than 4 mm. The greater the distance p, the less the curvature that the film is able to perform in the first plane and therefore the greater the adaptability of the light diffuser to different forms of luminaire or lighting systems. Moreover, the greater the distance/pitch p, the more visible the corrugations and the resultant pattern of light emitted through the light diffuser.

In particular, small stripes will become visible in the luminance pattern of the corrugated diffusers if the period is too large. This affects the uniformity of light output by a luminaire containing the light diffuser. Appropriate selection of a value for the pitch can reduce/avoid this issue.

However, smaller values for the distance/pitch p are more difficult to manufacture, requiring more expensive/specialist equipment. Thus, it is preferable that the maximum distance/pitch p be no less than 1 mm, e.g., no less than 2 mm.

The value of the distance/pitch p is preferably in the range $p \geq P_1$; $p \leq P_2$ and/or $P_1 \leq p \leq P_2$. Example values for $P_1$ include: 1 mm or 2 mm. Example values for $P_2$ include: 10 mm, 6 mm or 4 mm. Other suitable values will be apparent to the skilled person.

The film will have a thickness t. The thickness of the film is preferably less than 5 mm, and more preferably less than 2 mm. The thinner the film, the less light is absorbed by the film and the less material is used to form the film.

It has previously been mentioned how the value of certain parameters of the light diffuser can affect the visibility of the corrugations and the resultant pattern in light emitted therethrough.

Generally, the perceptibility of a spatial pattern (with respect to both its size and contrast) to an individual can be described by a contrast sensitivity function (CSF). An average human contrast sensitivity function is illustrated in FIG. 6.

Figure 6:
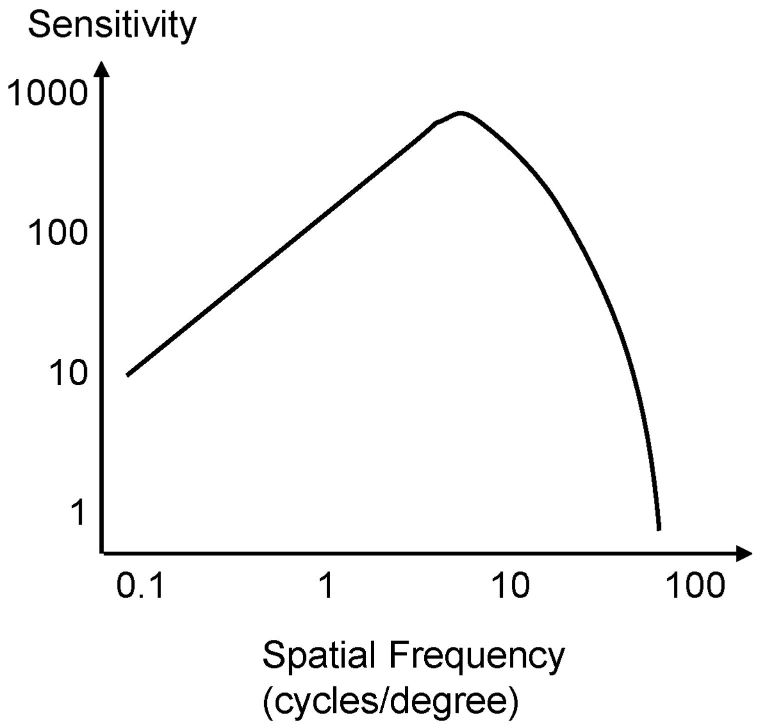
FIG. 6 illustrative a contrast sensitivity function.

FIG. 6 thereby illustrates an average human CSF, where values below the curve represent perceivable or visible stimuli. FIG. 6 illustrates the contrast sensitivity level for achromatic light at an intensity of around 2000 cd/m$^2$.

As can be seen in the Fig. above, the CSF depends on spatial frequency (size of the pattern at the location of the individual) and the contrast of the light (change in amplitude of the luminance signal caused by the pattern). The chromaticity and luminance level will also influence the output value of the CSF.

Intuitively, it will be clear that at closer viewing distances a higher contrast sensitivity (meaning a lower contrast) is needed for the pattern to be not perceptible by an individual.

Using this graph (or similar graphs/information), it is possible to identify a suitable value for the pitch of the light diffuser. In particular, it has been identified that a pitch of less than 10 mm, and more preferably less than 4 mm, has limited/negligible impact on the visibility of the light diffuser to an individual at a conventional distance (e.g., >1 m) from the light diffuser compared to a non-corrugated light diffuser.

Figure 7:
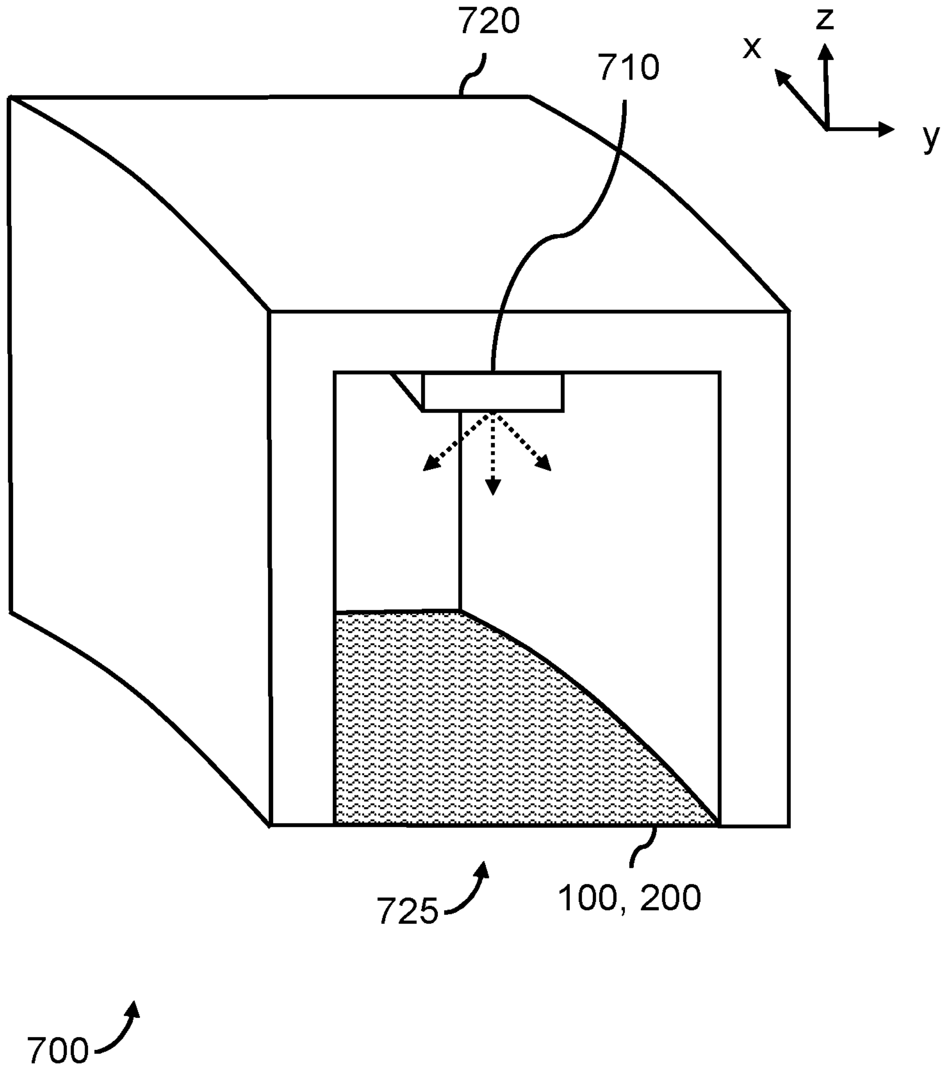
FIG. 7 illustrates a luminaire according to an embodiment.

FIG. 7 illustrates a portion of a luminaire 700 according to an embodiment.

The luminaire 700 comprises a light emitting arrangement 710 configured to emit light (illustrated with dotted lines). Examples of suitable light emitting arrangements 710 are well known in the art, and include LEDs, LED strings and so on.

The luminaire 700 also comprises a housing 720, configured to house the light emitting element, and comprising a light exit window 725 for permitting the exit of light emitted by the light emitting arrangement out of the housing.

The luminaire 700 also comprises the light diffuser 100, 200 herein described, configured to cover the light exit window 725 to diffuse light exiting through the light exit window. In particular, the housing 720 may mount and/or support the light diffuser thereon.

Preferably, and as illustrated, light exit window 725 is curved and the light diffuser 100 is configured to follow the curve of the light exit window. This approach takes advantage of the ability to curve or bend the proposed light diffuser.

Preferably, the light exit window is formed as an elongate curve.

Of course, the luminaire 700 may comprise any additional elements necessary for controlling and/or powering the emission of light by the light emitting arrangement. For instance, the luminaire may comprise driving or power conversion circuitry and/or control circuitry. These elements have not been illustrated for the sake of conciseness. Other suitable elements will be apparent to the skilled person.

Figure 8A:
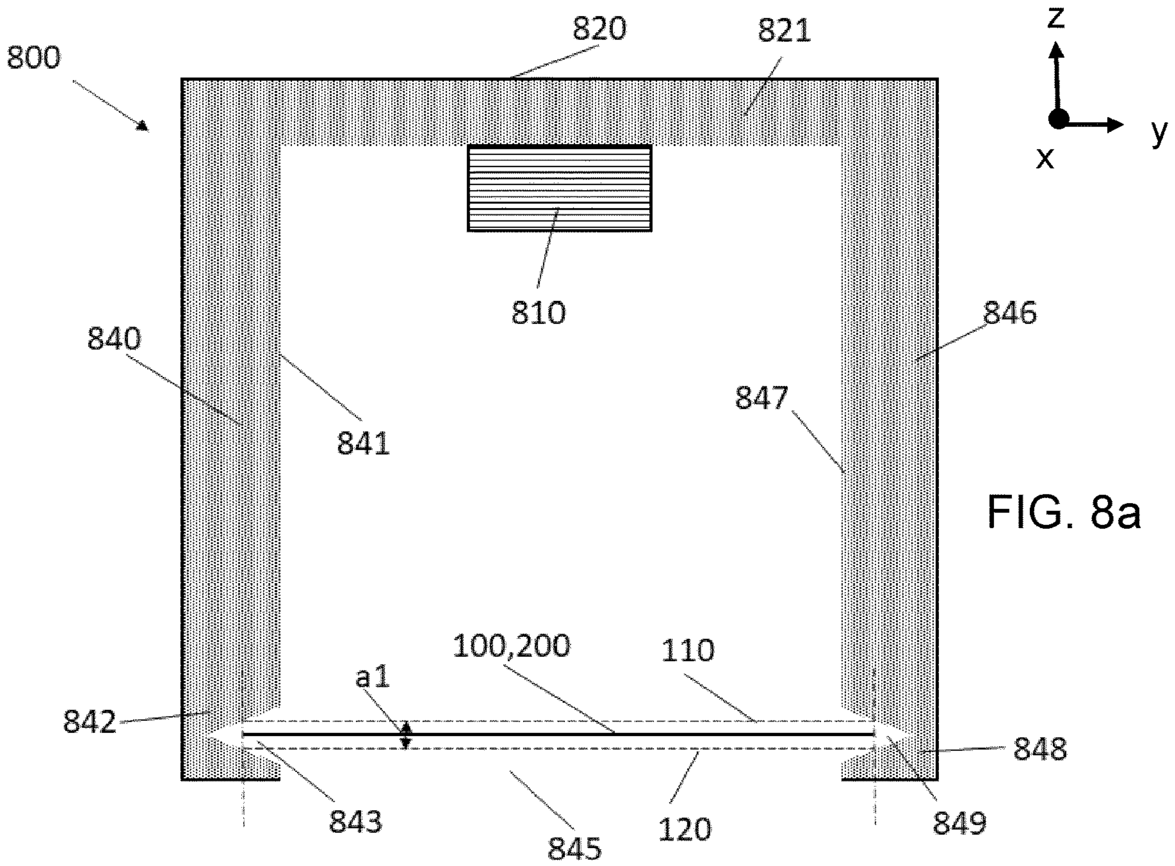
FIG. 8*a-b* illustrate cross sections of a luminaire according to another embodiment.
Figure 8B:
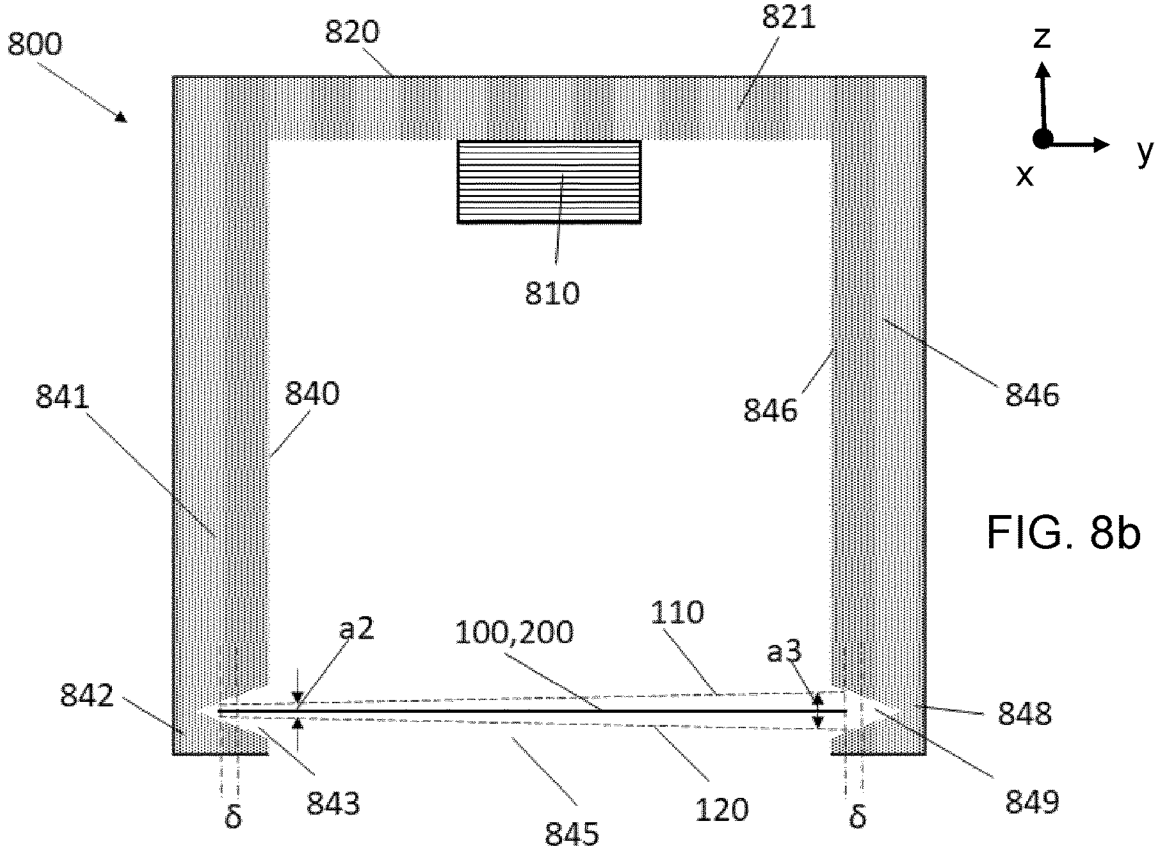

FIG. 8*a-b* illustrates cross sectional views, i.e. in the y-z-plane, of another embodiment of a luminaire 800 according to the invention and elongated in the x-direction. FIG. 8*a* shows the cross section of the luminaire when in unbend form, and FIG. 8*b* shows the cross section of the luminaire in bended form. In transverse cross-section the housing 820 is U-shaped, having a bottom portion 821 on which the light emitting arrangement 810 is arranged, and having two opposite side walls 840, 846 extending perpendicularly from the bottom portion. Each side wall has a respective inner wall surface 841, 847 in which at a respective end portion 842, 848 adjacent the light exit window 845 a respective elongated slot 843, 849 is provided, said slots extending in the elongated direction (x-direction) of the luminaire. The light diffuser 100, 200 is arranged at the light exit window and held in position by both slots in that the diffuser is partly accommodated therein. Typically, at least portions of the slots are equally wide or wider than the distance a1 between the ridge 110 and the groove 120 of the light diffuser, thus to offer space for the light diffuser to expand upon bending. As shown in the FIGS. 8*a*-*b*, the slots have a tapered V-shaped form in cross section to hold the light diffuser snugly both in unbend and in bended form. Especially, the thickened part of the light diffuser, having a distance a3 formed upon bending of the light diffuser, shifts over a shift δ to the wider portion of the V-shaped slot, while the thinned part of the light diffuser, having a distance a2 formed upon bending of the light diffuser, shifts by (about) the same shift δ to the narrower portion of the V-shaped slot.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to". If the term "arrangement" is used in the claims or description, it is noted the term "arrangement" is intended to be equivalent to the term "system", and vice versa.

Any reference signs in the claims should not be construed as limiting the scope.

The invention claimed is:

1. A luminaire comprising:

a light emitting arrangement configured to emit light;

a housing, configured to house the light emitting element, and comprising a light exit window for permitting the exit of light emitted by the light emitting arrangement out of the housing; and a light diffuser configured to cover the light exit window to diffuse light exiting through the light exit window and comprising a film of light diffusive material, wherein:

the film is corrugated to form a series of alternating ridges and grooves along a first direction (x) lying in a first plane, each ridge being located above the first plane and each groove being located below the first plane, such that application of a force ($f_1$) to the film in a second direction (y) causes the film to curve or bend in the first plane; and the second direction lies in the first plane and is perpendicular to the first direction, wherein the housing has two opposing side walls, each side wall having a respective elongated slot in a respective inner wall and adjacent the light exit window for holding the light diffuser, and wherein the light exit window is curved and the light diffuser is configured to follow the curve of the light exit window.

2. The luminaire of claim 1, wherein, when no force is applied to the film in the second direction, the distance ($a_1$) between each ridge and the first plane and the distance between each groove and the first plane is no less than 1 mm.

3. The luminaire of claim 1, wherein, when no force is applied to the film in the second direction, the distance ($a_1$) between each ridge and the first plane and the distance between each groove and the first plane is no greater than 6 mm.

4. The luminaire of claim 1, wherein the application of the force to the film in the second direction causes:

a resultant center of curvature of the film to be defined; and the distance between each ridge/groove and the first plane to become larger at a side of the film closer to the resultant center of curvature than the distance between each ridge/groove at a side of the film further from the resultant center of curvature.

5. The luminaire of claim 1, wherein the maximum distance between any two neighboring ridges, or any two neighboring grooves, is no more than 10 mm, and preferably no more than 6 mm.

6. The luminaire of claim 1, wherein the maximum distance between any two neighboring ridges, or any two neighboring grooves, is no less than 0.5 mm.

7. The luminaire of claim 1, wherein the thickness of the film of light diffusive material is less than 2 mm, and preferably less than 0.5 mm.

8. The luminaire of claim 1, wherein the film has a sinusoidal shape, a sawtooth shape, or a square wave shape to define the series of alternating ridges and grooves.

9. The luminaire of claim 1, wherein both the distance between each ridge and the first plane and the distance between each groove and the first plane decreases responsive to the film being stretched in the first direction.

10. The luminaire of claim 1, wherein the film is produced using an extrusion and/or rolling process.

11. The luminaire of claim 1, wherein said elongated slot is v-shaped in cross-section.

12. The luminaire of claim 1, wherein the light exit window is formed as an elongate curve.

* * * * *